(12) United States Patent
Radu et al.

(10) Patent No.: US 7,086,683 B2
(45) Date of Patent: Aug. 8, 2006

(54) SUNVISOR ATTACHMENT FOR VEHICLES AND METHOD FOR MAKING THE SAME

(75) Inventors: Bogdan Radu, Dearborn, MI (US); James Mestemaker, Lambertville, MI (US); Mark Heinze, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 62 days.

(21) Appl. No.: 10/710,498

(22) Filed: Jul. 15, 2004

(65) Prior Publication Data

US 2006/0012209 A1   Jan. 19, 2006

(51) Int. Cl.
*B60J 3/00* (2006.01)
(52) U.S. Cl. ...................... 296/97.5; 362/136; 359/844
(58) Field of Classification Search ............... 296/97.1, 296/97.5; 362/135–137; 359/844
See application file for complete search history.

(56) References Cited

U.S. PATENT DOCUMENTS

| | | | |
|---|---|---|---|
| 4,552,328 A | 11/1985 | Dutt et al. ..................... 249/67 |
| 4,596,416 A | 6/1986 | Muller | |
| 4,725,089 A | 2/1988 | Langer | |
| 4,740,028 A | 4/1988 | Connor ........................ 296/97 |
| 4,902,061 A | 2/1990 | Plavetich et al. | |
| 4,919,470 A | 4/1990 | Muller ....................... 296/153 |
| 4,925,072 A | 5/1990 | Masler et al. | |
| 5,018,800 A | 5/1991 | Cziptschirsch et al. .. 312/344.1 |
| 5,050,922 A | 9/1991 | Falcoff | |
| 5,144,963 A | 9/1992 | Dabringhaus et al. ...... 131/231 |
| 5,199,449 A | 4/1993 | Dabringhaus et al. ...... 131/231 |
| 5,355,254 A | 10/1994 | Aymerich et al. ........... 359/844 |
| 5,387,390 A | 2/1995 | Kornylo ..................... 264/46.8 |
| 5,445,430 A | 8/1995 | Nichols ...................... 296/153 |
| 5,489,039 A | 2/1996 | Brownlie et al. | |
| 5,520,313 A | 5/1996 | Tishihide | |
| 5,533,772 A | 7/1996 | Volkers et al. ............. 296/37.9 |
| 5,603,540 A | 2/1997 | Shibao | |
| 5,626,382 A | 5/1997 | Johnson et al. .......... 296/146.7 |
| 5,647,713 A | 7/1997 | Ge et al. ..................... 411/509 |
| 5,671,096 A | 9/1997 | Yoshida et al. | |
| 5,692,711 A | 12/1997 | Tucker ........................ 248/118 |
| 5,803,415 A | 9/1998 | Konishi et al. ............... 248/18 |
| 5,902,006 A | 5/1999 | Janker et al. ................ 296/153 |
| 5,906,409 A | 5/1999 | DeRees et al. .......... 296/146.7 |
| 5,951,094 A | 9/1999 | Konishi et al. ............. 296/153 |

(Continued)

FOREIGN PATENT DOCUMENTS

FR   2589111   4/1987

(Continued)

OTHER PUBLICATIONS

Examiner, U.S. Patent and Trademark Office, *Office Action*, issued Aug. 16, 2005 to U.S. Appl. No. 10/710,499.

(Continued)

*Primary Examiner*—Joseph D. Pape
(74) *Attorney, Agent, or Firm*—Wood, Herron & Evans, L.L.P.

(57) ABSTRACT

The present invention provides for an improved sunvisor attachment, and to a two shot molding method for making the same, having a reduced number of parts and that is adapted to be coupled to a sunvisor for use as a sunvisor assembly in a vehicle. To this end, the sunvisor attachment includes a body and a cover with each including at least one integrally formed connecting member being pivotally coupled together so that the cover may be opened and closed to uncover and cover a mirror and/or light.

10 Claims, 6 Drawing Sheets

U.S. PATENT DOCUMENTS

| | | | |
|---|---|---|---|
| 6,013,210 A | 1/2000 | Gardner, Jr. | 264/40.1 |
| 6,017,617 A | 1/2000 | Gardner, Jr. | 428/309.9 |
| 6,085,953 A | 7/2000 | Bober et al. | |
| 6,092,858 A | 7/2000 | Bolwell | 296/146.7 |
| 6,106,261 A | 8/2000 | von Holdt | 425/130 |
| 6,116,672 A | 9/2000 | Cannon et al. | |
| 6,125,030 A | 9/2000 | Mola et al. | |
| 6,213,538 B1 | 4/2001 | Scheidmantel et al. | 296/153 |
| 6,248,200 B1 | 6/2001 | Dailey et al. | 156/245 |
| 6,248,205 B1 | 6/2001 | Scheidmantel et al. | 156/309.6 |
| 6,296,796 B1 | 10/2001 | Gordon | 264/255 |
| 6,347,824 B1 | 2/2002 | Akouri et al. | 296/97.5 |
| 6,391,232 B1 | 5/2002 | Fritsch | 264/46.6 |
| 6,470,627 B1 | 10/2002 | Fukuo | |
| 6,544,449 B1 | 4/2003 | Gardner | 264/46.5 |
| 6,562,275 B1 | 5/2003 | Martinez | 264/308 |
| 6,575,528 B1 | 6/2003 | Tiesler et al. | |
| 6,583,359 B1 | 6/2003 | Cabello-Colon | |
| 6,629,716 B1 | 10/2003 | Shibata et al. | |
| 6,637,795 B1 | 10/2003 | Jonardi et al. | |
| 6,669,258 B1 | 12/2003 | Kato | |
| 6,695,691 B1 | 2/2004 | Le | |
| 6,702,354 B1 | 3/2004 | Galijasevic | 296/37.1 |
| 6,742,823 B1 | 6/2004 | Guanzon et al. | |
| 6,820,921 B1 | 11/2004 | Uleski | |
| 6,874,667 B1 | 4/2005 | Dykstra et al. | |
| 6,883,680 B1 | 4/2005 | Hirose | |
| 6,918,502 B1 | 7/2005 | Overholt et al. | |
| 6,926,332 B1 | 8/2005 | Youngs et al. | |
| 6,971,698 B1 | 12/2005 | King | |
| 2001/0052715 A1 | 12/2001 | McAndrew et al. | |
| 2002/0043861 A1 | 4/2002 | Meadows | 297/411.21 |
| 2002/0066972 A1 | 6/2002 | Fritsch | 264/46.4 |
| 2003/0075944 A1 | 4/2003 | Galijasevic | 296/37.1 |
| 2003/0080131 A1 | 5/2003 | Fukuo et al. | |
| 2003/0206985 A1 | 11/2003 | Gedritis et al. | 425/130 |
| 2004/0216753 A1 | 11/2004 | Fox | |

FOREIGN PATENT DOCUMENTS

| | | |
|---|---|---|
| JP | 11268574 | 10/1999 |
| WO | 2005/068154 | 7/2005 |

OTHER PUBLICATIONS

U.S. Patent and Trademark Office, *Office Action mailed* Mar. 7, 2006, related U.S. Appl. No. 10/710,497.

SUNVISOR ATTACHMENT FOR VEHICLES AND METHOD FOR MAKING THE SAME

CROSS-REFERENCE

The present invention is related to U.S. Ser. No. 10/708,561, filed Mar. 11, 2004, U.S. Ser. No. 10/710,497, filed Jul. 15, 2004 and U.S. Ser. No. 10/710,499, filed Jul. 15, 2004.

FIELD OF THE INVENTION

The present invention pertains generally to automotive interiors and more particularly to a sunvisor attachment for automotive interiors, and a method for making the same.

BACKGROUND OF THE INVENTION

It is known to provide automotive interiors with various assemblies to improve the comfort and convenience, as well as the safety, for vehicle occupants. Examples of some of these interior assemblies include the instrument panels, armrests, door trim panels, consoles, and sunvisors. In some of these assemblies, various compartments or attachments are incorporated therein that allow the vehicle occupant, for example, to conveniently store items or to provide additional lighting.

With certain attachments, such as those for sunvisors, it is desirable to include a cover that may overlie, for example, a vanity mirror and/or light when these items are not in use such as when the sunvisor is in a stowed or raised position. The cover for these attachments is typically attached to a body, such as by a hinge mechanism, so that the cover can be pivotally opened and closed as desired by the vehicle occupant to reveal or cover the mirror and/or light. Unfortunately, current sunvisor attachments have some drawbacks.

The primary drawback is in the manufacturing and assembly of the parts for these sunvisor attachments. The current process for making a sunvisor attachment typically includes forming the body having an opening in a first mold. The opening being adapted to receive at least a mirror and/or light. The attachment cover then is individually formed in a second and separate mold. A further separate connecting member, usually a pair of metal or plastic cylindrical hinge pins, then is used to couple the cover to the body. Moreover, current sunvisor attachments typically include a pair of damping mechanisms to provide some resistance to opening and closing the cover. The as-formed sunvisor attachment may then be inserted into the sunvisor for use as a sunvisor assembly in a vehicle.

Thus, under current manufacturing processes, sunvisor attachments comprise several different parts each having different part numbers that must all be appropriately supplied, tracked, shipped, inventoried and eventually assembled to make the complete product. These multiple part assemblies in turn lead to significant administrative and labor costs, which increase the overall costs of production.

There is thus a need for an improved sunvisor attachment and a method for making the same that reduces the number of parts and the labor required for assembly thereof thereby reducing overall manufacturing costs.

SUMMARY OF INVENTION

The present invention provides for an improved sunvisor attachment having a reduced number of parts and that is adapted to be coupled to a sunvisor for use as a sunvisor assembly in a vehicle.

To this end, the sunvisor attachment includes a first member, which is either a body or cover, having at least one connecting member integrally formed therein made from a first material. The sunvisor attachment further includes a second member, which is the other of the body or cover, having at least one connecting member integrally formed therein and made from a second material different from the first material. The first and second materials can include thermoplastic material with one of the materials having a higher melting point than the other. The at least one first member connecting member includes at least one projecting portion and the at least one second member connecting member includes at least one receiving portion that receives the at least one projecting portion. As such, the body as well as the cover is an integrated, unitary structure. The body further advantageously includes at least one item such as a mirror and/or light retained therein. The projecting and receiving portions accordingly are pivotally coupled together so that the attachment cover can be opened and closed to uncover and cover the at least one item.

In an exemplary embodiment, the sunvisor attachment includes a body having a mirror positioned within an opening therein. The body further includes an integrated pair of spaced apart connecting members with each having a projecting portion extending therefrom. Each projection portion defines a pin having an enlarged distal end defining a circular portion. The cover similarly includes an integrated connecting member having a pair of spaced apart receiving portions with each defining a bore having an enlarged receiving end defining a circular recess. Each recess receives one of the circular portions to couple the cover to the body such that the cover is pivotally moveable between an open position, wherein the mirror is uncovered, and a closed position, wherein the cover overlies the mirror. Advantageously, the body is composed either of polyamide 12 or 20–30% glass filled polybutylene terephthalate. The cover advantageously may be polypropylene, polyoxymethylene, or polyamide 6.

The sunvisor attachment is formed by a two shot molding operation. In a first shot of the molding operation, the first material is injected into a mold to form the first member, i.e. the body or cover, having the at least one integrated connecting member that includes the at least one projecting portion extending therefrom. Next, a mold chamber is formed about at least a portion of the first member, and more specifically, about a portion of the at least one projecting portion. After the first member has been allowed time sufficient to cure, the second material is injected into the mold chamber in a second shot of the molding operation to form the second member, i.e. the other of the body or cover, having the at least one integrated connecting member that includes the at least one receiving portion. In addition, the body, after molding, can include at least one opening, which may extend therethrough or define a cavity, adapted to retain at least one item such as a mirror and/or light so that at least one item may be provided and placed therein. Alternatively, a mirror and/or light may be molded directly into the body during the molding operation. The second material has a lower melting point than the first material to avoid fusion of the receiving portion to the projecting portion. Accordingly, the at least one receiving portion overmolds the at least one projecting portion so that the body and cover are pivotally coupled together.

After the second material has been allowed time sufficient to cure, the sunvisor attachment is ready to be received within a sunvisor for use as an automotive sunvisor assembly.

By virtue of the foregoing, there is thus provided an improved sunvisor attachment having a reduced number of parts and that is adapted to couple to a sunvisor for use as a sunvisor assembly in a vehicle.

The features and objectives of the present invention will become more readily apparent from the following Detailed Description taken in conjunction with the accompanying drawings.

BRIEF DESCRIPTION OF DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
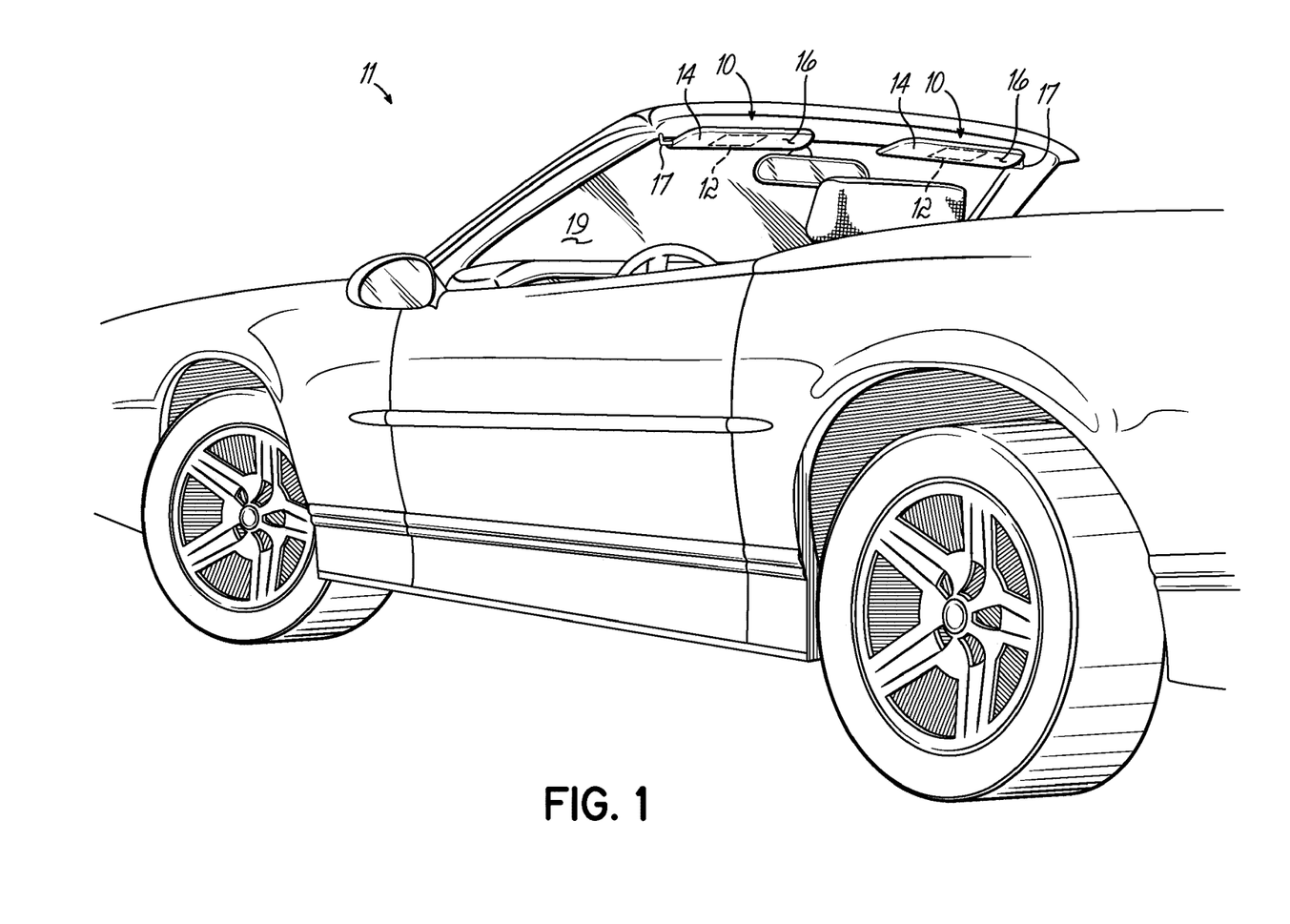
FIG. 1 is a perspective view of an automobile having a sunvisor assembly including an embodiment of the sunvisor attachment of the present invention secured in a sunvisor.

In FIG. 1, there is shown a sunvisor assembly 10 for a motor vehicle 11 including an embodiment of the sunvisor attachment 12 of the present invention coupled to a sunvisor 14. The sunvisor assembly 10 improves the comfort and convenience of vehicle occupants by providing a vanity mirror and/or additional lighting. Also, sun glare is lessened or eliminated when the sunvisor assembly 10 is used in a lowered position thereby increasing the overall safety of the vehicle's occupants.

Figure 2:
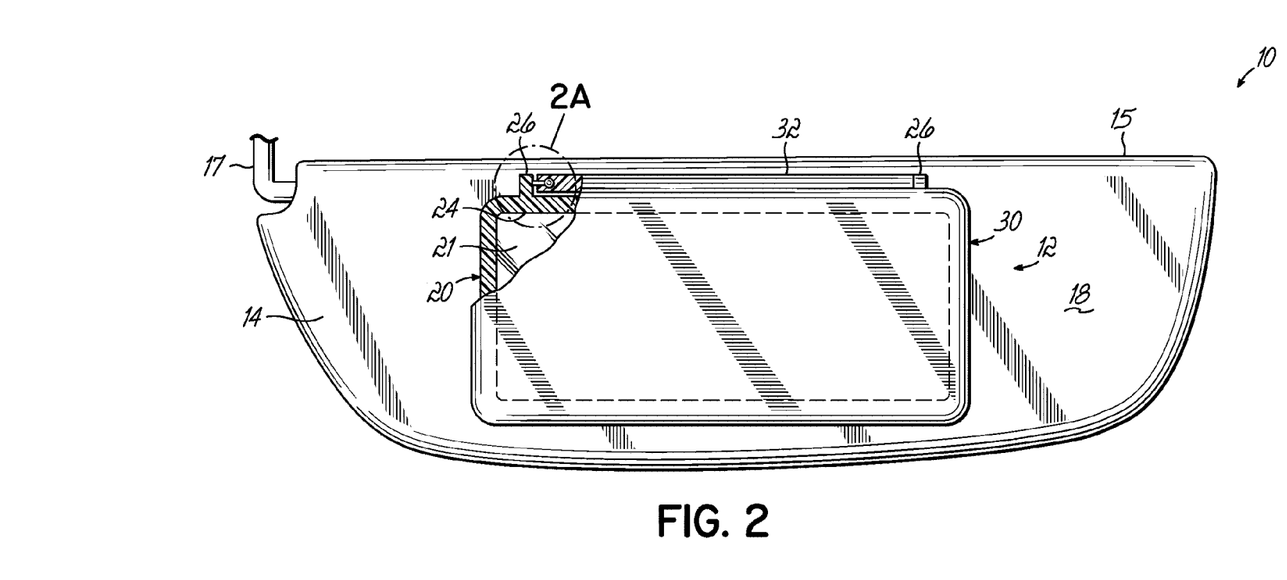
FIG. 2 is a top plan view of the sunvisor assembly of FIG. 1 showing a cut-away portion of the sunvisor attachment to illustrate the coupling between the cover and body.

With further reference to FIGS. 1 and 2, the sunvisor 14 is a relatively rigid substrate, which receives the sunvisor attachment 12 and which forms at least a portion of the structural support and defines the general shape of the sunvisor assembly 10. The sunvisor may have a cover member 15 disposed over the front and back surfaces 16, 18 to provide an aesthetically pleasing appearance as well as to provide a soft touch, and further may have a foam layer (not shown) encased between the substrate and the cover member 15 to further enhance the feel and/or appearance thereof.

The sunvisor 14 may be pivotally secured by a mounting member 17, as is known in the art, to the interior of the vehicle 11 generally in a position relative to the top portion of the windshield 19 and substantially above a front-seated occupant (not shown). The sunvisor 14 additionally includes a front and back surface 16 and 18 with the sunvisor attachment 12 being primarily cooperatively associated with the back surface such that when the sunvisor assembly is in a stowed or raised position, the sunvisor attachment 12 is substantially hidden. Alternatively, when the sunvisor assembly 10 is in a lowered position, the front surface 16 typically faces the windshield and away from an occupant with the back surface 18 facing the occupant so that the sunvisor attachment 12 may be utilized as desired.

Figures 2A, 2B:
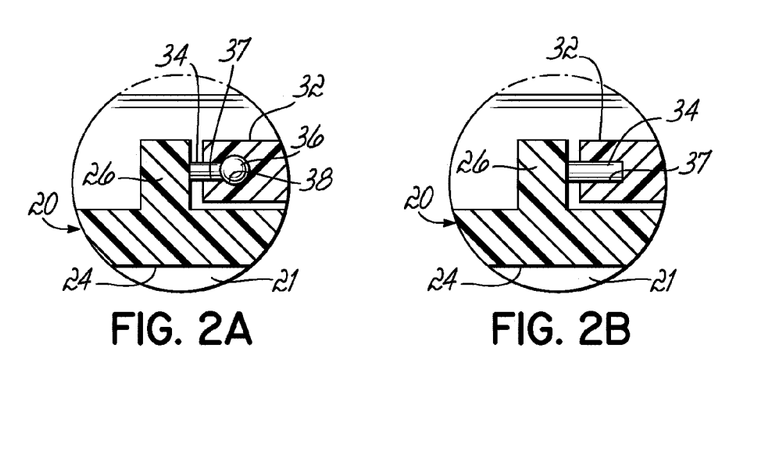
FIG. 2A is an enlarged view of the incircle portion 2A showing the coupling between the cover and body of FIG. 2.
FIG. 2B is a figure similar to FIG. 2A showing another embodiment of the present invention.
Figure 4:
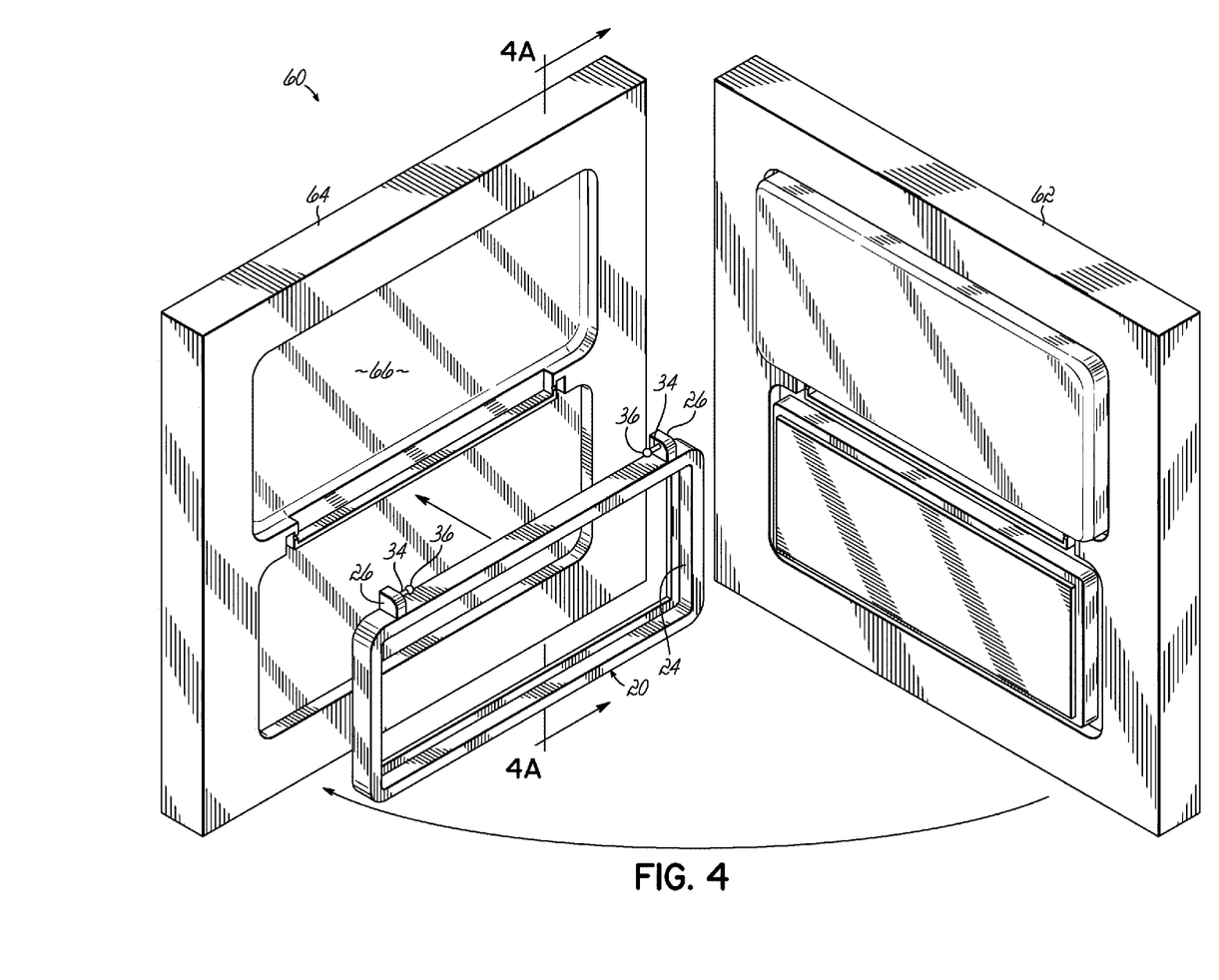
FIG. 4 is a perspective view of a mold used to form the cover of the sunvisor attachment.

As best shown in FIGS. 2–2A and 4, the sunvisor attachment 12 includes a body 20 having a mirror 21 being retained within an opening 24 of the body 20. It should be understood that one or more openings may be provided to accommodate one or more mirrors 21, as well as one or more lights (not shown). In addition, the opening may extend through the body 20 or define a cavity (not shown) so that the mirror(s) 21 and/or light(s) may be retained therein, or alternatively, a mirror(s) 21 and/or light(s) may be molded directly into the body 20 as described below. The body 20 further includes a pair of spaced apart connecting members 26 integrally formed therein. While two connecting members 26 are shown in FIGS. 2 and 4, it should be understood by the artisan that one connecting member or more than two connecting members may be provided integrally formed with the body 20. The compartment body 20 is made of a thermoplastic material such as a thermoplastic synthetic resin, advantageously polyamide 12 or 20–30% glass filled polybutylene terephthalate.

Figure 5:
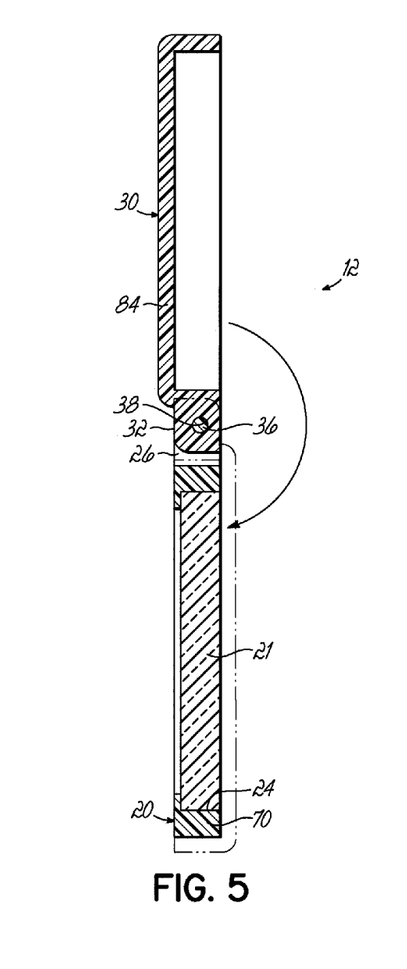
FIG. 5 is a cross-sectional view of the sunvisor attachment of FIG. 4B removed from the mold and showing the cover in an open and closed position.

As best shown in FIGS. 2 and 5, the sunvisor 12 also has a cover 30 including one connecting member 32 integrally formed therein. It similarly should be understood by the artisan that more than one connecting member 32 may be provided integrally formed with the cover 30. The cover 30 is made of a thermoplastic material such as a thermoplastic synthetic resin, advantageously polypropylene, polyoxymethylene, or polyamide 6, and further has a different melting point from the material of the body 20. Advantageously, the cover material includes a lower melting point than the compartment body material.

With further reference to FIGS. 2 and 2A, each integral connecting member 26 of the body 20 includes a projecting portion defining a pin 34 having an enlarged distal end defining a circular portion 36. The integral connecting member 32 of the cover 30 includes a pair of spaced apart receiving portions defining a bore 37 having an enlarged receiving end defining a circular recess 38. Accordingly, the connecting members 26 of the body 20 cooperate with the connecting member 32 of the cover 30 to couple the cover 30 to the compartment body 20, and more specifically, each recess 38 receives one of the circular portions 36 to pivotally couple the cover 30 to the body 20 such that the cover 30 is moveable, as shown in FIG. 5, between an open position, wherein the mirror 21 is uncovered, and a closed position, wherein the cover 30 overlies the mirror 21.

it should be understood by the artisan that the projecting portions 34 and receiving portions 37 can comprise any multitude of desired shapes and sizes for pivotally coupling together the body 20 and cover 30. By way of example, FIG. 2B shows another embodiment of the sunvisor attachment 12 wherein the pin 34 is devoid of the circular portion 36 while the corresponding bore 37 similarly is devoid of the recess 38. Accordingly, the bore 37 receives the pin 34 to pivotally couple the cover 30 to the compartment body 20. It also should be understood that the body connecting members 26 may include more that one projecting portion 34 and the cover connecting member 32 may include any number of corresponding receiving portions 37. It is further understood that the cover 30, alternatively, could be provided with one or more projecting portions 34 while the compartment body 20, alternatively, could be provided with one or more integrated receiving portions 37.

The sunvisor attachment 12 further may include one or more hinge springs (not shown) cooperating with the body 20 and the cover 30 to assist with movement of the cover 30 from the open position to the closed position.

Figure 3:
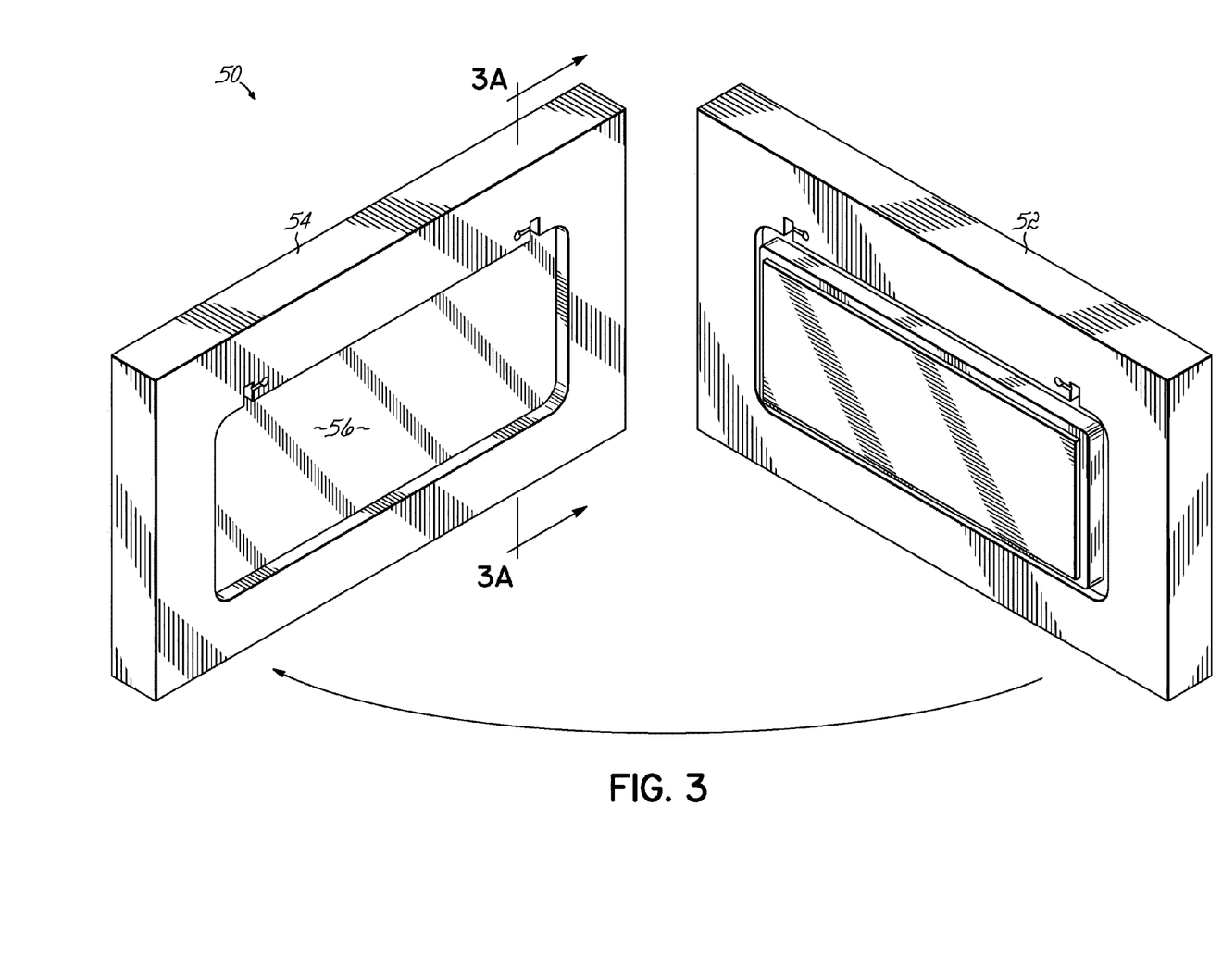
FIG. 3 is a perspective view of a mold used to form the body of the sunvisor attachment of the present invention.

With reference to FIGS. 3–5, a method of making the sunvisor attachment 12 of the present invention will now be described. More specifically, the sunvisor attachment 12 is formed by a two-shot molding operation wherein a first shot molds one of either the body 20 or the cover 30, and wherein a second shot molds the other of the body 20 or cover 30 to couple the parts together. To this end, in FIG. 3, a first mold 50 is shown including a top portion 52 and a bottom portion 54 defining a first cavity 56 adapted to mold a first member, i.e. the body 20, in a first shot. In FIG. 4, a second mold 60 is shown including a top portion 62 and bottom portion 64 defining a cavity 66 adapted to mold a second member, i.e. the cover 30, in a second shot. While the first and second molds 50, 60 are illustrated separately, it should be understood that the first and second molds 50, 60 may be provided together in a single mold assembly as is well known in the art.

Figure 3A:
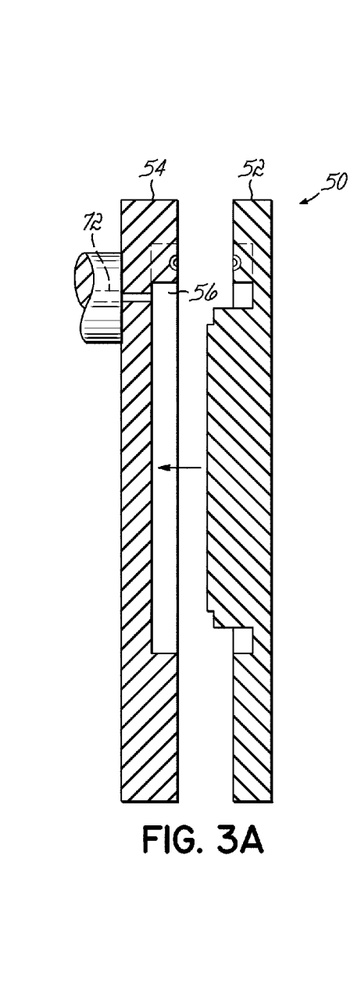
FIG. 3A is the first in a series of sequential cross-sectional views of the mold of FIG. 3 taken along the lines 3A—3A illustrating the first shot of the molding operation of the sunvisor attachment.
Figure 3B:
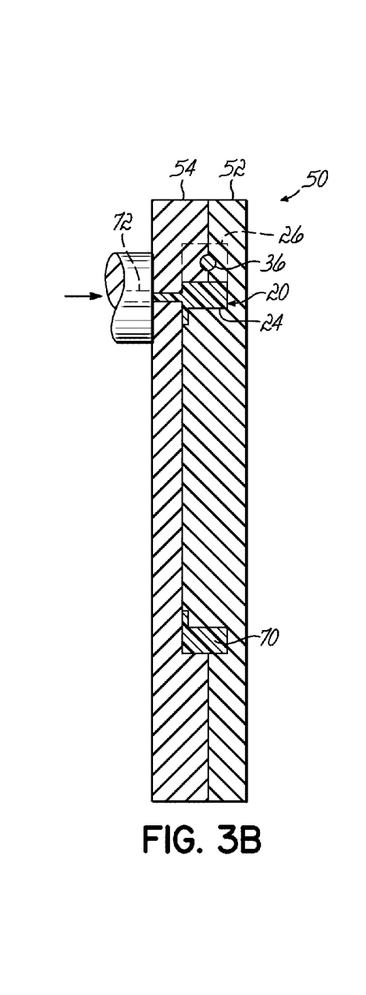
FIG. 3B is the second in this series of cross-sectional views.

As best shown in FIGS. 3A and 3B, to mold the body 20, the first mold 50 is closed and a first curable material 70 is injected through a channel 72, in a first shot, into the space formed between the top and bottom portions 52, 54. The first curable material 70 advantageously is a thermoplastic material such as a thermoplastic synthetic resin, and more advantageously polyamide 12 or 20–30% glass filled polybutylene terephthalate. The injected material 70 is allowed sufficient time to cure to form the compartment body 20.

As best shown in FIGS. 3B and 4, the molded body 20 defines the opening 24 extending therethrough and being adapted to retain one or more items, i.e. the mirror 21. As above indicated, one or more openings 24 may be formed therein to accommodate one or more mirrors 21, as well as one or more lights (not shown). The opening 24 may extend through the body 20 or define a cavity (not shown) so that the mirror(s) 21 and/or light(s) may be retained therein. Alternatively, the mirror(s) 21 and/or light(s) may be provided during this operation and molded directly into the body 20. The compartment body 20 further includes the pair of integrally formed, spaced apart connecting members 26 with each having the projecting portion extending therefrom defining the pin 34 having the enlarged distal end defining the circular portion 36.

With further reference to FIG. 4, after the body 20 is molded in FIG. 3B, the body 20 is moved from the first mold 50 to the bottom portion 64 of the second mold 60. Movement of the body 20 to the second mold 60 can occur by methods commonly known in the art such as by hand, i.e. manually, by robotic means, or by utilizing a rotating mold assembly. With respect to the rotating mold assembly (not shown), the first member, e.g. the body, may be formed in a first mold as stated above. The mold is then opened and the first member, rather than being manually or robotically moved, is rotated, e.g. 180 degrees, on a rotating platen to coordinate with a second mold to form the second member, e.g. the cover. The rotating mold assembly advantageously allows for simultaneous molding of first and second members.

Figure 4A:
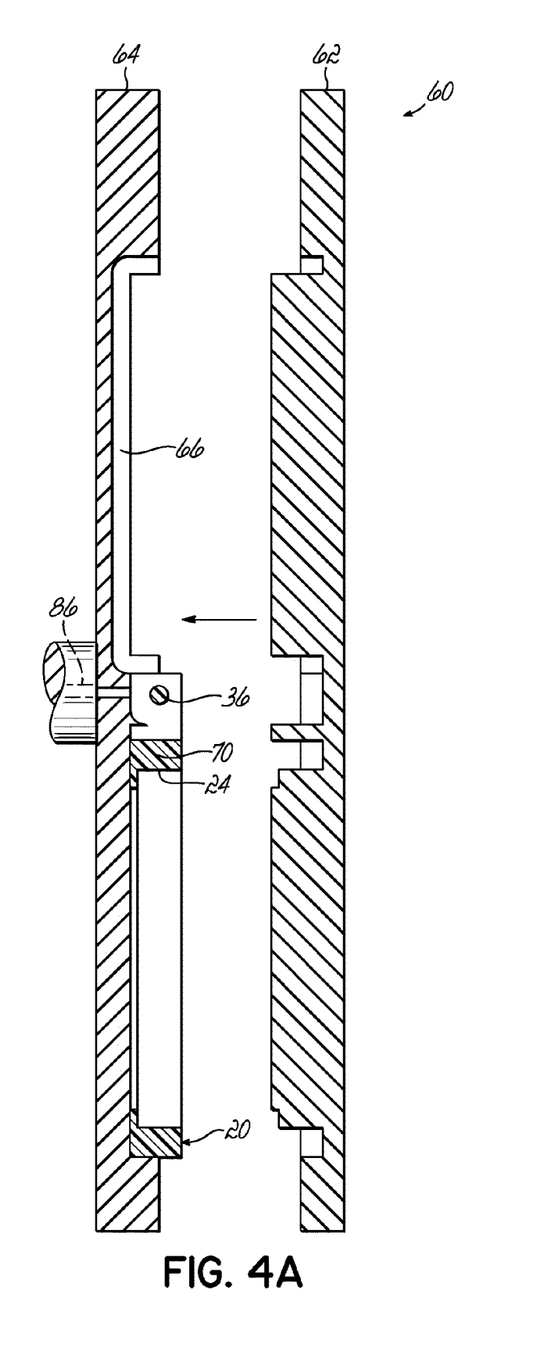
FIG. 4A is the first in a series of sequential cross-sectional views of the mold of FIG. 4 taken along the lines 4A—4A illustrating the second shot of the molding operation of the sunvisor attachment.
Figure 4B:
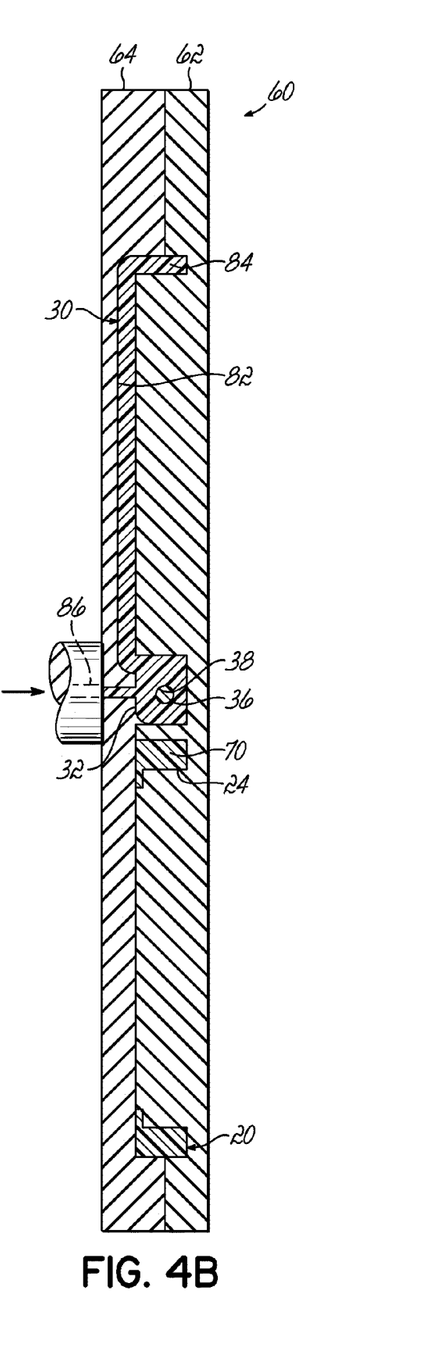
FIG. 4B is the second in this series of cross-sectional views.

As best shown in FIGS. 4, 4A, and 4B, after the body 20 has been moved to the second mold 60, a portion of the connecting members 26, and more specifically, a portion of the projecting portions 34 are received within the cavity 66 of the second mold 60 that is adapted to mold the cover 30. Notably, the second mold 60 is closed to form a mold chamber 82 about the portion of the projecting portions 34. A second curable material 84 then is injected through a channel 86, in a second shot, into the space, i.e. the mold chamber 82, formed between the top and bottom portions 62, 64. This second curable material 84 has a lower melting point than the first curable material 70. Accordingly, the second material 84 is provided at a lower temperature than the melting point of the first material 70 so as to avoid fusion of the recess 38 to the cylindrical portion 36. The second material 84 advantageously is a thermoplastic material such as a thermoplastic synthetic resin, and more advantageously polypropylene, polyoxymethylene, or polyamide 6.

As further shown in FIGS. 4B and 5, the injected material 84 is allowed sufficient time to cure to form the cover 30 at a position 180 degrees relative to the body 20. After the sunvisor attachment 12 is formed, the mold 60 may be opened and the sunvisor attachment 12 ejected therefrom. Accordingly, the cover 30 includes the integrally formed connecting member 32 including the pair of spaced apart receiving portions defining the bore 37. Each bore 37 has the enlarged receiving end defining the circular recess 38 being overmolded the circular portions 36 so that the body 20 and cover 30 are pivotally coupled together.

The mirror 21 may now be provided and inserted within the opening 24 of the body 20 and may be retained therein by means commonly known in the art such as by snap-fit, adhesion, friction fit, and the like. As best shown in FIGS. 2 and 5, the cover 30 of the formed sunvisor attachment 12 is moveable between the open position, wherein the mirror 21 is uncovered, and the closed position, wherein the cover 30 overlies the mirror 21. Notably, the first and/or second curable materials 70, 84 further may be selected based upon a desired shrinkage property to provide for varying degrees of friction between the projecting portions 34 and receiving portions 37 to alter the ease with which the cover 30 may be opened and closed.

Additionally, one or more hinge springs (not shown) further may be provided to cooperate with the body 20 and the cover 30 to assist with movement of the cover 30 from the open position to the closed position.

Advantageously, the molding operation of the present invention may be continuously performed utilizing a single mold assembly to provide an improved sunvisor attachment 12. The molded sunvisor attachment 12, as shown in FIG. 1, now may be received within the sunvisor for use as the sunvisor assembly 10.

Although the above method has described molding the first member as the body 20 and molding the second member as the cover 30, it should be understood that the cover 30, alternatively, could be molded as the first member while the body 20, alternatively, could be molded as the second member. It is further understood that the receiving portions 37, alternatively, may be formed with the first member while the projecting portions 34 alternatively may be formed with the second member.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

The invention claimed is:

1. An automotive sunvisor assembly, comprising:
a sunvisor; and
a sunvisor attachment coupled to said sunvisor, said sunvisor attachment comprising:
a body having at least one item retained therein and further including at least one connecting member integrally formed therein made from a first material; and
a cover including at least one connecting member integrally formed therein made from a second material having a different melting point from said first material, said at least one body connecting member cooperating with said at least one cover connecting member to couple said cover to said body, said cover being moveable between an open position, wherein said at least one item is uncovered, and a closed position, wherein said cover overlies said at least one item.

2. The sunvisor assembly of claim 1, wherein said at least one body connecting member comprises at least one projecting portion extending therefrom, and wherein said at least one cover connecting member comprises at least one receiving portion which receives said at least one projecting portion.

3. The sunvisor assembly of claim 2, wherein said at least one projecting portion defines a pin.

4. The sunvisor assembly of claim 2, wherein said at least one receiving portion defines a bore.

5. The sunvisor assembly of claim 1, wherein the at least one item includes a mirror and/or a light.

6. The sunvisor assembly of claim 1, wherein said at least one body connecting member includes a pair of spaced apart connecting members, each said pair of spaced apart connecting members having at least one projecting portion defining a pin having an enlarged distal end defining a circular portion, and wherein said at least one cover connecting member includes one connecting member, said cover connecting member including a pair of spaced apart receiving portions with each defining a bore having an enlarged receiving portion defining a circular recess, each said recess receiving one of said circular portions to couple said cover to said body.

7. The sunvisor assembly of claim 6 wherein the body further includes an opening and the at least one item includes a mirror being retained within the opening.

8. The sunvisor assembly of claim 1, wherein said cover is pivotally movable between said open and closed position.

9. The sunvisor assembly of claim 1, wherein said first material is selected from the group consisting of polyamide 12 and 20–30% glass filled polybutylene terephthalate and wherein said second material is selected from the group consisting of polypropylene, polyoxymethylene, and polyamide 6.

10. The sunvisor assembly of claim 1, wherein said first material has a higher melting point than said second material.

* * * * *